(12) United States Patent
Broderick (10) Patent No.: US 9,279,515 B2
(45) Date of Patent: Mar. 8, 2016

(54) EXHAUST VALVE

(75) Inventor: Michael Broderick, Pollerton Big (IE)

(73) Assignee: OSENEY LIMITED, Dublin (IE)

( * ) Notice: Subject to any disclaimer, the term of this patent is extended or adjusted under 35 U.S.C. 154(b) by 448 days.

(21) Appl. No.: 13/501,821

(22) PCT Filed: Oct. 11, 2010

(86) PCT No.: PCT/EP2010/065221
§ 371 (c)(1),
(2), (4) Date: Jun. 5, 2012

(87) PCT Pub. No.: WO2011/045284
PCT Pub. Date: Apr. 21, 2011

(65) Prior Publication Data
US 2012/0228531 A1 Sep. 13, 2012

(30) Foreign Application Priority Data
Oct. 13, 2009 (IE) .................................. 2009/0794

(51) Int. Cl.
*F16K 1/06* (2006.01)
*F16K 27/02* (2006.01)

(52) U.S. Cl.
CPC .. *F16K 27/02* (2013.01); *F16K 1/06* (2013.01)

(58) Field of Classification Search
CPC ............. F16K 1/06; F16K 27/02; F16K 1/08; F16K 27/0272
USPC .......... 137/544, 546, 550, 329; 251/118, 123, 251/127, 154, 318, 319, 324, 366, 367
See application file for complete search history.

(56) References Cited

U.S. PATENT DOCUMENTS

| | | | | | |
|---|---|---|---|---|---|
| 199,814 | A | * | 1/1878 | Fifield | 251/118 |
| 791,889 | A | * | 6/1905 | Ellis et al. | 210/153 |
| 1,401,468 | A | * | 12/1921 | Logan | 137/1 |
| 1,493,409 | A | * | 5/1924 | Wiley | 137/454.6 |
| 1,852,233 | A | * | 4/1932 | Dailey | 137/584 |
| 2,190,422 | A | * | 2/1940 | Hansen | 251/118 |
| 2,346,938 | A | * | 4/1944 | Oravec | 251/118 |
| 3,072,140 | A | * | 1/1963 | Kmiecik et al. | 137/428 |
| 3,529,630 | A | * | 9/1970 | Podolsky | 137/630.13 |
| 5,063,954 | A | * | 11/1991 | Hendrick | 137/625.31 |
| 5,427,358 | A | | 6/1995 | Eggleston et al. | |
| 7,201,182 | B2 | * | 4/2007 | Eernisse | 137/375 |
| 2006/0219972 | A1 | | 10/2006 | Eernisse | |

(Continued)

FOREIGN PATENT DOCUMENTS

| | | |
|---|---|---|
| FR | 2664014 A1 | 1/1992 |
| JP | 51-133019 U | 10/1976 |
| JP | H01-116280 U | 8/1989 |

(Continued)

OTHER PUBLICATIONS

PCT International Search Report for PCT/EP2010/065221, mail date Jan. 26, 2011.

*Primary Examiner* — Matthew W Jellett
(74) *Attorney, Agent, or Firm* — Rossi, Kimms & McDowell LLP (57) ABSTRACT

A valve body (91) for enabling release of pressurized steam from a pressure vessel, the valve body comprising: a steam inlet (92), a steam outlet (93), and an internal wall defining a flow path between said inlet and said outlet, wherein at least a portion (102) of said internal wall in a region opposed to the steam inlet is removable.

16 Claims, 7 Drawing Sheets

(56) References Cited

U.S. PATENT DOCUMENTS

2007/0119312 A1* 5/2007 Broderick .................. 99/584
2010/0096578 A1* 4/2010 Franz et al. ................ 251/318
2010/0288960 A1* 11/2010 Taylor ....................... 251/324
2010/0326545 A1* 12/2010 Broderick .................. 137/544

FOREIGN PATENT DOCUMENTS

JP       7-293709 A    11/1995

* cited by examiner

EXHAUST VALVE

This application is a U.S. National Phase Application of PCT International Application PCT/EP2010/065221, filed Oct. 11, 2010, which is based on and claims priority from IE 20090794, filed Oct. 13, 2009. The contents of the documents cited in this paragraph are hereby incorporated herein by reference in their entireties

FIELD OF THE INVENTION

The field of the invention relates to the release of pressure, e.g. steam pressure, especially product processing systems, and in particular for systems for the processing or treatment of food products. The field of the invention also relates to the passage of slurry, gas, and the like through a valve in a system. More specifically, the field of the invention relates to steam peeling, especially steam peeling systems, more particularly steam peeling apparatus including a steam peeler pressure vessel. The present invention is specifically directed to pressure relief or reduction arrangements for steam exhaust from a steam peeler pressure vessel.

BACKGROUND TO THE INVENTION

Reference is made to Applicant's International Patent Application No. PCT/IE2004/000003, Publication No. WO 2004/062392, in which there is described a pressure release arrangement for stream treatment of product to be peeled in a steam peeling system. A valve is described for enabling release of pressurized steam from a pressure vessel, the valve has a steam inlet flange and a steam outlet flange and is self-sealing, and being held closed during operation by steam pressure from steam peeling system. When not in use, a pneumatic device keeps the valve closed.

The elbow type shape of the valve body of the prior art mentioned above was primarily used to aid in the efficient and rapid exhaustion of steam from the pressure release system. The system is biased for the steam to exit the steam outlet flange. However, the steam arriving at high velocity from the pressure vessel during the exhaustion phase would also meet the elbow type shape of the valve body wall and thus, further directing the steam to exit via the steam outlet flange.

A problem that arises with the valve body of the prior art peeling system above is that carry-over of solids, corroding agents, and chlorides from the pressure vessel during steam exhaustion come in contact with the internal wall of the valve body at high velocity. The solids, corroding agents, and chlorides travel in a linear plane in the steam flow and come in contact with the inner wall of the valve body at the point where the valve body curves to form the steam outlet flange. The constant impact of the carry-over solids, corroding agents, and chlorides at this point causes gradual wear, cracking, and erosion of the valve body, which leads the user having to replace the damaged valve body.

It is an object of the present invention to address the above problems experienced by the prior art valve bodies, and provide an improved valve body for use with steam peeling systems, or controlled release of steam pressure.

SUMMARY OF THE INVENTION

The present invention relates to a valve body for enabling release of pressurized steam from a pressure vessel, the valve body comprising: a steam inlet, a steam outlet, and an internal wall defining a flow path between said inlet and said outlet, wherein at least a portion of said internal wall in a region opposed to the steam inlet is removable.

In one embodiment of the invention, the valve body may comprise internally a central region from which branches an inlet arm, an outlet arm and an extension arm, wherein the steam inlet is formed in a distal open end of the inlet arm, the steam outlet is formed in a distal closable end of the outlet arm and the removable portion of said internal wall is defined within the extension arm.

In the above embodiment, the inlet arm, the outlet arm and the extension arm may be cylindrical, or substantially cylindrical, and may be square or rectangular in cross-section.

The valve body of the present invention is preferably arranged so that the steam inlet and the removable portion of the internal wall lie in a common plane. As the steam is exhausted from a pressure vessel in a pressure release system or steam peeling system, this arrangement may aid in reducing the velocity of any particles suspended in the exhausted steam. This arrangement may further change the direction of the flow of particles in the steam stream. The arrangement protects the outlet arm of the valve from wear as the arrangement allows the high velocity impacts of particles suspended in the exhausted steam to impinge on the removable portion of the internal wall.

Preferably, the extension arm diverges away from an internal path through the valve body linking the steam inlet with the steam outlet. The steam inlet and steam outlet may be substantially perpendicular to one another, or at an angle of between approximately 120° and approximately 135°.

A central axis of the extension arm and a central axis of the outlet arm may be substantially perpendicular to one another, or at an angle of between approximately 120° and approximately 135°.

In a further embodiment of the present invention, said extension arm may comprise an end plate for sealing a distal end of the extension arm. It is desirable that the end plate is the removable portion of the internal wall. It is further desirable that the end plate is detachable from the valve body. The end plate is preferably positioned at a distal end of the extension arm where it aids in reducing the velocity of particles travelling with the steam during steam exhaustion when the valve body is used with a steam peeling system. Any particles caught up in the exhausted steam released form a pressure vessel will inherently travel to the distal end of the extension arm. As only the end plate will bear the brunt of high-speed particle collisions, it is the end plate that may suffer from damage. The advantage of having the end plate detachable from the valve body of the present invention is that the end plate may be removed and replaced if its structural integrity is compromised. As such, the valve body as a whole remains structurally sound and does not have to be replaced should the end plate lose its structural integrity.

The end plate and valve body may further comprise complementary engagement means. The complementary engagement means permits removal of the end plate from the valve body. Removing the end plate from the valve body permits a user to inspect the internal surface of the valve body, a valve spindle, a sealing gland, etc. for any structural defects and the like.

In a further arrangement, the end plate further comprises a plug member receivable into the valve body. The plug member is adapted for insertion into the extension arm of the valve body. It is desirable that the plug member is removably attached to the end plate. The front surface of the plug member defines the removable portion of the internal wall and acts to receive high velocity and high pressure impacts imparted by particles, corroding agents, and chlorides which maybe suspended in the steam exhausted from a pressure vessel. The advantage of the plug member is that it can be easily replaced if the structural integrity of the member is compromised due to such high velocity impacts. Replacing the plug member further extends the life of the valve body. In addition, removal of the end plate with the plug member attached also permits the user to inspect the internal surface of the valve body, a valve spindle, a sealing gland, etc. for structural defects.

The plug member may be of any shape and size. In one embodiment, the front face of the plug member is planar. In a further embodiment, the front face of the plug member is arcuate, mimicking the internal structure of a substantially elbow-type valve body, and extends to sit proud of a bend of the valve body forming the steam outlet portion. This arrangement further protects the valve body from damage due to high velocity and high pressure impacts from particles suspended in the exhausted steam.

It is desirable that the valve body is reversible. It is further desirable that the valve body is substantially symmetrical about the central axis of the outlet arm. The advantage of having the valve body reversible is that the valve body may be turned 180 degrees about its vertical axis. As such, while maintaining the steam outlet in connection with an exhaust vessel, the valve body can be turned around and still maintain a connection with a pressure release vessel/steam peeling system. Should structural features other than the end plate experience wear and tear from solid particles carried over in the steam exhaust stream, reversing the valve body will permit the user to carry on using the valve body without having to replace it due to a collapse or weakening of the structural integrity of the valve.

It is desirable that valve body is substantially symmetrical about the central axis of the outlet arm.

In a further embodiment of the valve body of the present invention, the valve body may further comprise a port for a valve system operable to open and close the steam outlet.

Where suitable, it will be appreciated that all optional and/or preferred features of one embodiment of the invention may be combined with optional and/or preferred features of another/other embodiment(s) of the invention.

BRIEF DESCRIPTION OF THE DRAWINGS

Additional features and advantages of the present invention are described in, and will be apparent from, the detailed description of the invention and from the drawings in which.

DETAILED DESCRIPTION OF THE DRAWINGS

It should be readily apparent to one of ordinary skill in the art that the examples disclosed herein below represent generalised examples only, and that other arrangements and methods capable of reproducing the invention are possible and are embraced by the present invention.

Figure 1:
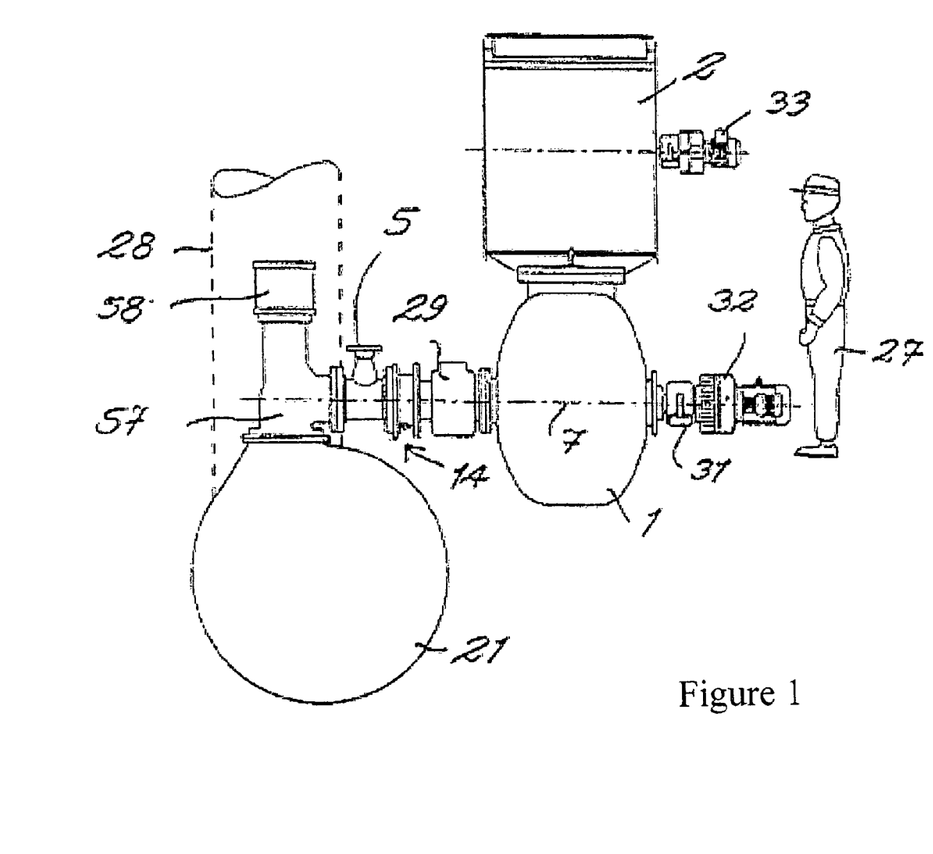
FIG. 1 illustrates a prior art pressure release valve within a steam peeling system.

FIG. 1 shows a prior art pressure release exhaust valve in use within a steam peeling system, as disclosed in WO-A-01/93704. A steam peeling pressure vessel 1 is mounted for rotation about an axis 7. The pressure vessel 1 is supported for rotation on a structure also providing operator access to the system, whenever required. It should be understood that the prior art pressure release exhaust valve is also suitable for use with a static pressure vessel, that is, a non-rotating pressure vessel. In-feed to the pressure vessel 1 is provided by a conveyor belt to a rotary batching unit 2, by which product is transferred to the pressure vessel 1 in measured quantities. The representation of a human FIG. 27 in FIG. 1 is intended to indicate the scale of the system in this exemplary embodiment.

FIG. 1 shows the relative dispositions of the batching unit 2 and the pressure vessel 1, together with the relationship between the pressure vessel 1 and an expansion chamber or vessel 21 which is located below the pressure vessel 1. A large diameter stack 28 extends from the expansion chamber to a discharge location or cyclone (not shown in these drawings) for waste or exhaust steam.

Figure 2:
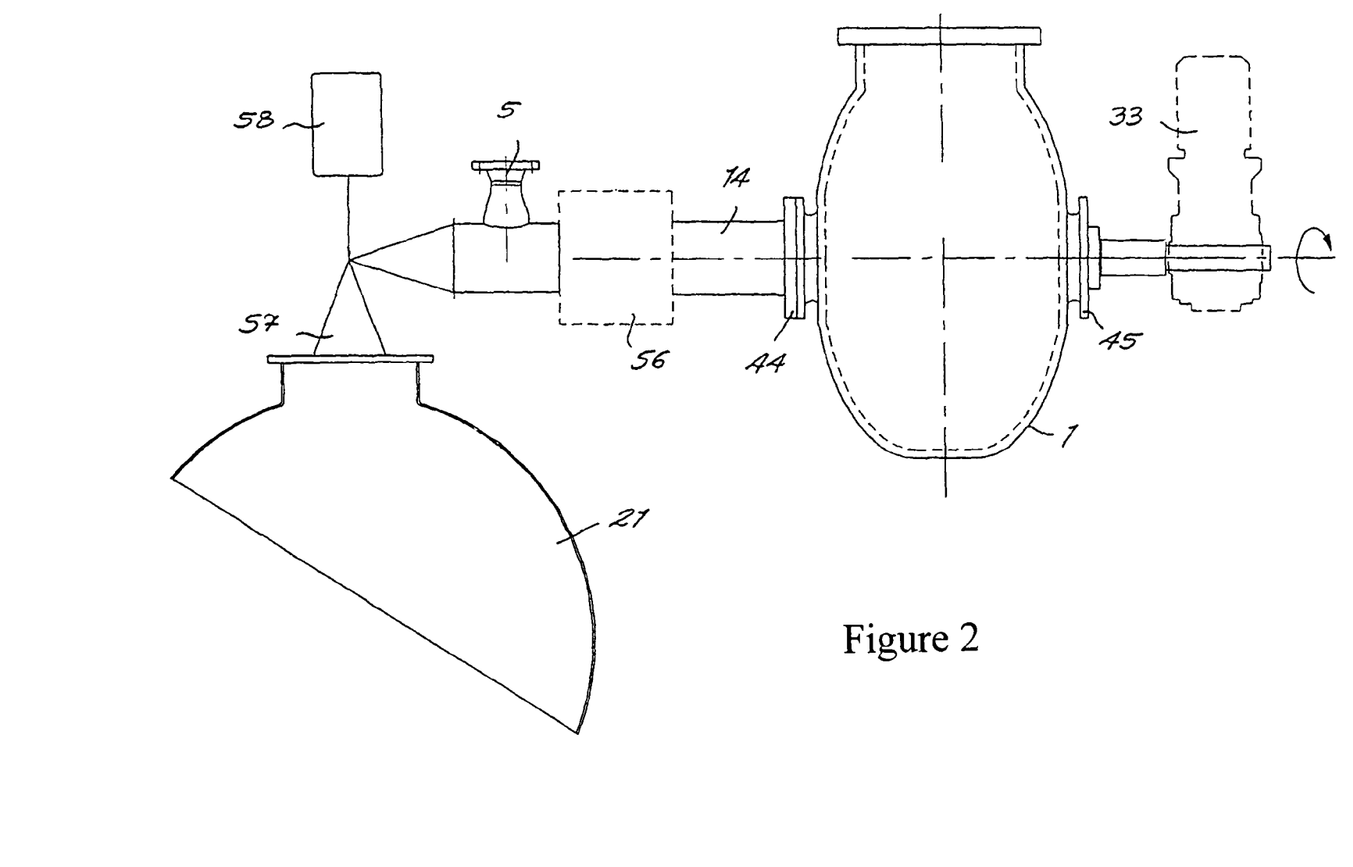
FIG. 2 is an end view of the rotatable steam peeling pressure vessel of the system of FIG. 1, showing rotary drive and steam feed and exhaust arrangements.

FIG. 2 shows the rotating mounting and steam discharge arrangements for the pressure vessel 1. On the right hand side of the pressure vessel 1 there is a drive motor 33, and an entry flange 45 (FIG. 1) as shown in the drawing. On the left-hand side of the drawing, steam entry and exit is effected through a flange 44 and bearing 29 (FIG. 1). Communication between the interior of the pressure vessel 1 and the single combined steam charging and discharge line 14 is effected through a rotary gland 56 with suitable packing. Thus steam admission and steam discharge takes place through a single steam port. There is only one steam port in the pressure vessel of the system, and this port serves alternately as an inlet port and an exhaust port. Steam is fed into the pressure vessel 1 through a charging line, not shown in the drawing, which communicates with line 14 by way of a suitable valve arrangement 5. Beyond the charging connection 5, in the direction away from the pressure vessel, the steam passage 14 from the pressure vessel 1 terminates at an expansion valve 57, which is mounted directly at and suitably on top of the expansion chamber 21 and defines a steam pressure release means of the system. It should also be understood that the steam could also be piped to a vertical or a horizontal remote pressure vessel.

The expansion valve 57 is exposed to pressurised steam during peeling and opens directly into the expansion vessel 21 at the appropriate time. The use of as large an expansion chamber 21 as possible means that discharge directly to atmosphere is to a significant degree simulated. Environmental regulations generally prohibit or exclude the possibility of direct discharge to atmosphere. For this reason, it is necessary to interpose an expansion chamber 21. Nonetheless the desirability remains of achieving the maximum possible rate of pressure drop into the expansion chamber 21.

As shown schematically in FIG. 2, the expansion valve 57 is an elbow valve with the internal diameter of the flow passage increasing substantially in proportion to the change from a typical nominal flange diameter at the input side (for example, 245 mm) to a larger nominal flange diameter (for example, 305 mm) at the output or steam discharge side of the valve 57 adjoining the expansion or blowdown chamber 21. Proceeding along the steam line 14 from the typical nominal flange size input side of the valve in the direction of the pressure vessel 1, there are provided in sequence, from the elbow valve 57 end, the steam admission control valve 5, the rotating steam gland 56, and a pipe section 14, which is of a substantially typical nominal diameter in a specific embodiment and passes through the main bearing 29 (FIG. 1), this large diameter pipe section 14 providing for both steam-in and exhaust.

There is thus substantially instantaneous reduction in pressure in the steam peeler vessel 1 when exhaust takes place. By substantially instantaneous is meant a drop in pressure to atmospheric pressure taking place within a very short time period. By mounting the exhaust valve 57 substantially directly on or at the decompression or expansion vessel 21, the invention provides for substantial maximisation of the possible or available pressure drop. The exhaust vessel 21 and expansion valve 57 are accordingly effectively combined, for optimisation of the pressure drop to atmospheric pressure. There is no lengthy separate duct communicating between expansion valve 57 and chamber 21. It should also be understood that the steam could also be piped to a vertical or a horizontal remote pressure vessel. There is therefore effectively instant exhaust via the exhaust valve 57 and the very short steam exhaust path or line 14 from the peeling vessel 1 to the expansion vessel or chamber 21.

Figure 3:
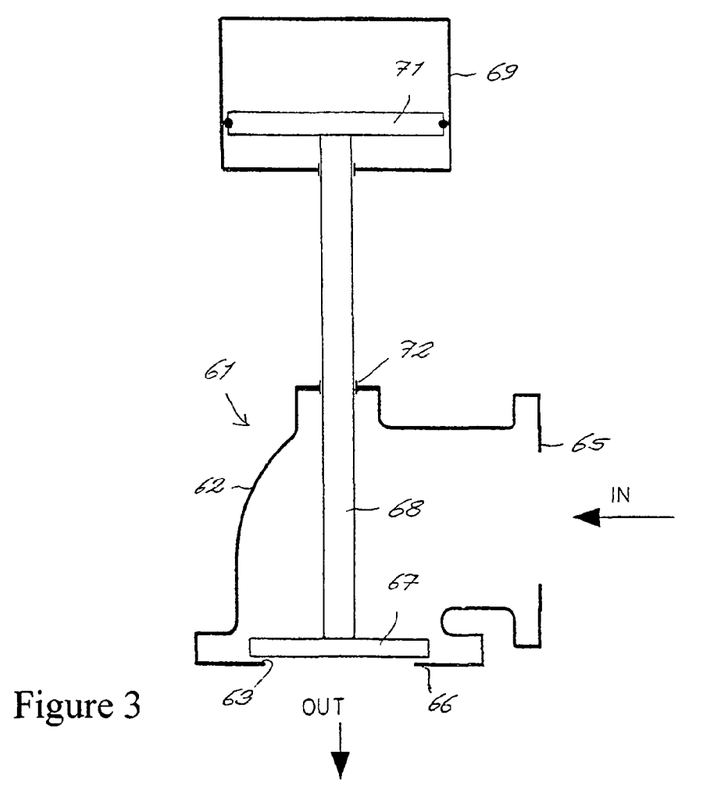
FIG. 3 is a diagrammatic cross-sectional view of the prior art pressure release valve of the system of FIG. 1.

FIG. 3 shows in detail the pressure release valve from the system of FIGS. 1 and 2. The valve 61 is self-sealing during pressurisation and is held closed by the steam pressure. Metal-to-metal, synthetic-to-metal, or synthetic-to-synthetic contact is provided between a valve seat 63 and a valve disk 67. This arrangement provides a self-cleaning effect at the valve seat 63. Service experience has shown that any wear arising at the valve seat 63 is substantially uniform, this being attributed to uniform velocity of exiting steam around the full periphery of the valve element 67 during the expansion stage. This uniformity of flow also enhances the self-cleaning effect. Service experience has also shown that gland packing 72 is almost maintenance free. In extended experimental use, no gland leakage was exhibited and only the most minimal adjustment was required. However, this valve construction suffers from carry-over of residues, resulting in significant damage to the structure and integrity of the valve. The convex shape of the valve lends itself to abrasion and structural damage due to the speed at which the residues strike the valve. This leads to a costly and inconvenient burden on the user to replace the damaged valve.

Figure 4:
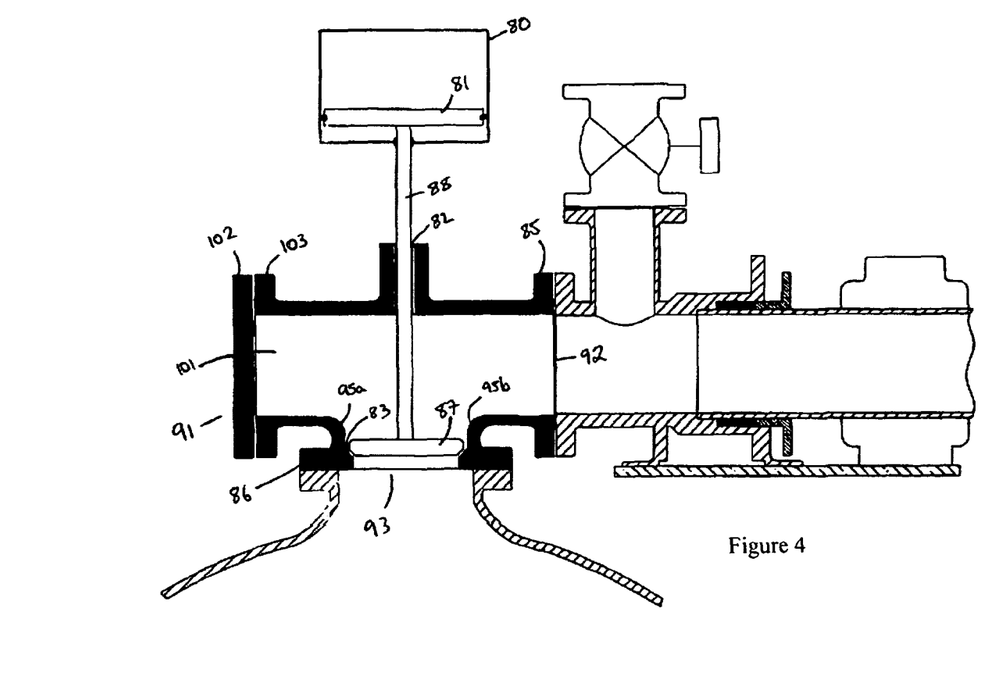
FIG. 4 is a diagrammatic cross-sectional view of a pressure release valve body according to the present invention.

FIG. 4 shows an improved pressure release valve body of the present invention. The valve body 91 of FIG. 4 is particularly suitable for a rotatable vessel such as that of FIGS. 1 to 3, but is not limited to rotating peelers. It is also applicable to static peelers, and to static and displaceable steam pressure vessels in other product treatment systems, as well as being suitable for use in substantially any circumstances where a rapid reduction in steam pressure (viz., substantial blowdown) is needed. The valve body of the invention may be applied to pressure relief in any product treatment system, whether using a static or displaceable (rotating) pressure vessel, and may be used with or without the particularly favoured arrangement described above with reference to a specific embodiment, in which there is a dimensional increase between valve entry and exit, or where there is no dimensional difference between the valve entry (inlet) and the exit (outlet). The valve body of the invention may be deployed in arrangements in which a different dimensional relationship applies between steam entry and exit, or where there is no dimensional difference between the valve entry (inlet) and the exit (outlet). It may also be applied to controlled release of steam pressure, liquid pressure, gas pressure, slurry processing etc. in any context, not necessarily limited to product treatment.

In the arrangement shown in FIG. 4, a valve closure element 87 closes against the valve exit opening, which defines a valve seat 83. Thus in the charged condition of the steam peeler, the steam pressure is active to hold the valve element 87 closed. A particularly simple valve construction is thereby facilitated, in which a valve spindle 88 that does not require any internal steam passages links the valve closure element 87 directly to a drive piston 81 of an air motor or actuator 80. The air motor 80 is required to be active to effect the valve opening and valve closing operations. The sole other component of the valve system 81 subject to relative movement and potential wear is the sealing gland 82 through which the valve spindle 88 passes where it leaves a valve body 91 and extends to the air motor 80.

The valve of FIG. 4 behaves essentially as an elbow valve, in that the path of the steam entering through steam inlet 92 undergoes a change in direction through substantially 90° before it exits through steam outlet 93. However, the valve takes a substantially T-shaped form. The curved back wall of a standard elbow valve has been dispensed with.

An inlet is formed in one arm of the "T"; an extension arm is formed in the other arm of the "T", directly opposite the inlet, while a sealable outlet is formed in the stem of the "T". The inlet and extension arm lie in a common plane. The outlet stem branches off from this plane intermediate the two arms. Opposite the outlet stem there is provided in the wall of the valve, a port 82 for the elongate valve spindle 88 of valve closure element 87.

The valve body 91 has a symmetrical form, having an input flange 85 defining the steam inlet 92 at one end, an output flange 86 defining a steam outlet 93, and an extension arm 101 opposed to and in communication with the steam inlet 92. The extension arm 101 is located beyond the steam outlet 93. The extension arm is sealed by an end plate 102 (also referred to as a sacrificial plate), which is fixed to an end flange 103 of the valve body 91. The end plate 102 may be constructed from any material routinely used by those skilled in the art of manufacturing valves, such as carbon steel, stainless steel, and the like.

As steam enters into the valve through inlet 92, any particles, corroding agents, and chlorides suspended in the steam will maintain a straight-line path through the valve into a extension arm region rather than undergo an immediate change in direction towards the outlet 93 as observed with the elbow joint valves of the prior art. The particles will lose velocity when impacting with the end plate 102 and are then carried out with the steam, although a proportion of the particles may "stick" to or become embedded on the end plate. Due to the high velocity and potentially high impact pressures involved in the exhaust process, cracking, corrosion and wear of the end plate can be expected due to the presence of solid particles in the exhausted steam impacting the end plate.

The end plate 102 is detachable from the valve body 91. This permits the end plate 102 to be replaced if damage caused over time by particles, corroding agents, chlorides, and the like in the steam being exhausted from a pressure vessel becomes critical such that the integrity of the end plate 102 is compromised. The end plate 102 and end flange 103 on the valve body 91 further comprise complementary engagement means (not shown) to facilitate replacement of a damaged end plate 102. Preferably, the complementary engagement means is selected from male/female formations, a clip, and any other engagement means known in the art that are described in the common general knowledge. In addition, the inner surface of the valve body 91 (or any part of the system such as a valve spindle, a sealing gland, etc) can be safely inspected with relative ease by simply removing the end plate 102.

It will be appreciated that the removable end plate acts as a removable portion of the internal wall of the valve body.

It is further envisaged that the particles may further impact on bend 95a. Accordingly, in a further embodiment, the valve body 91 is reversible. In cases when there are particles in the steam flow when steam is being exhausted from a pressure vessel, such particles may collide with a bend 95a connecting the steam outlet 93 with the end flange 103 at high velocity and high impact pressures. Over time, such high velocity and high pressure impacts may cause non-critical structural damage to the bend 95a. The valve body 91 is substantially T-shaped which allows the user to turn the valve body 91 180° about its vertical axis relative to the steam outlet 93. In other words, when the valve body 91 is reversed, the steam inlet 92 becomes an end flange, and the end flange 103 becomes a steam inlet. The end flange 103 and steam inlet 92 have identical complementary engagement means to engage with an end plate 102 and a steam pressure system, which allows this reversal to be possible. In this instance, the bend 95a and complementary bend 95b switch positions, thus prolonging the lifespan of the valve.

Figure 5:
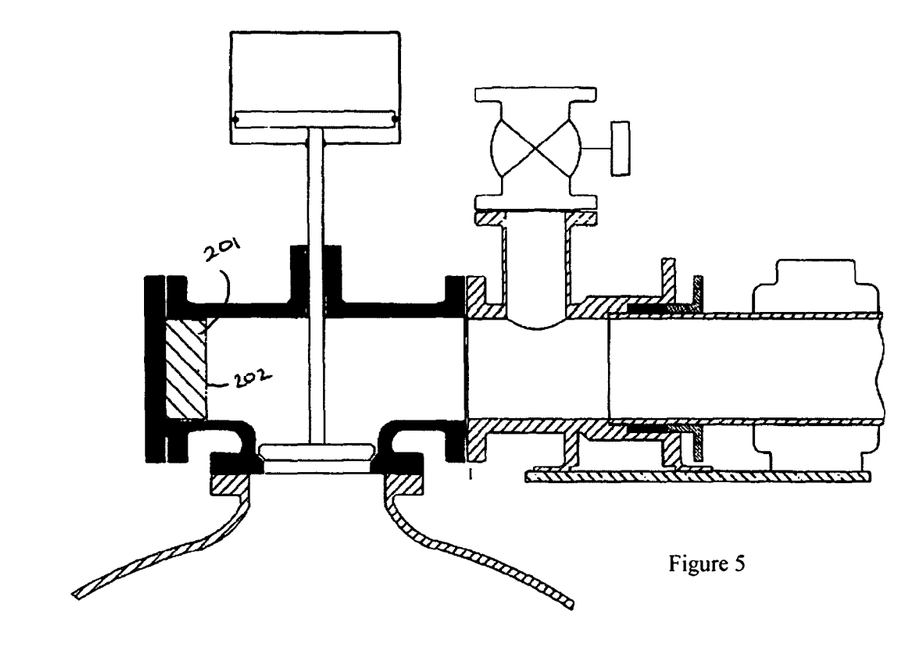
FIG. 5 is a diagrammatic cross-sectional view of an alternative embodiment of the pressure release valve body of FIG. 4.

In a still further embodiment of the present invention, as illustrated in FIG. 5, the end plate 102 further comprises a plug member 201 removably attached to the inner surface thereof. The plug member 201 is adapted for insertion into the extension arm of the valve body. The front or leading surface or face of the plug member 201 acts as a removable portion of the internal wall of the valve body as illustrated in FIG. 4. The front face 202 of the plug member 201 acts to receive the high velocity and high pressure impacts imparted by particles, corroding agents, and chlorides which may be suspended in the stream exhausted from a pressure vessel. Over time, such high velocity and high pressure impacts may cause non-critical or critical structural damage to the front surface 202 of the plug member 201. If the front surface 202 of the plug member 201 suffers critical damage over time, the plug member 201 can easily be replaced with a new plug member without undue burden or cost to the user. In addition, the inner surface of the valve body 91 (or any part of the system such as a valve spindle, a sealing gland, etc) can be inspected with relative ease by simply removing the end plate 102 with the plug member 201 attached.

Figure 6:
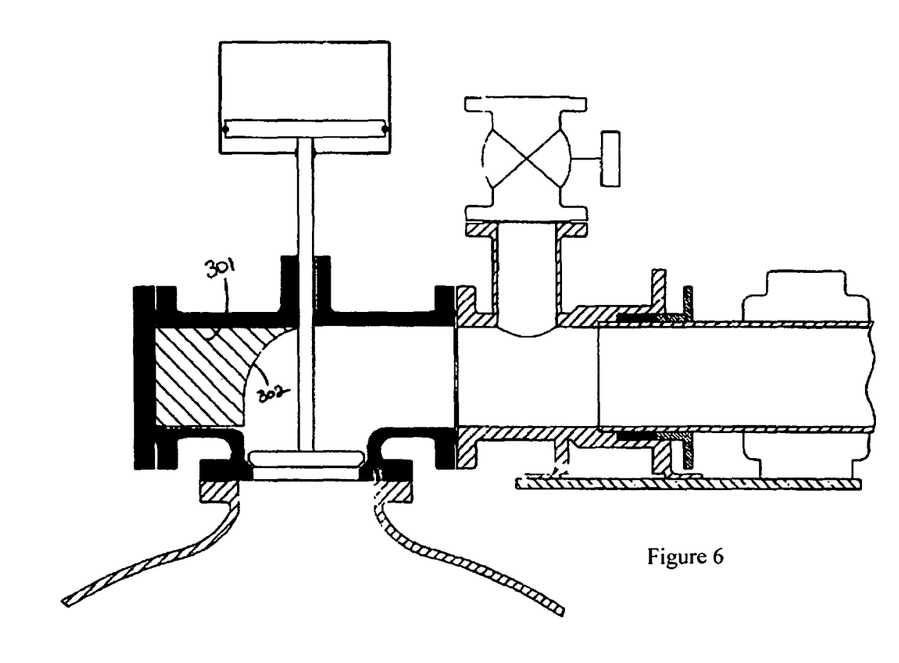
FIG. 6 is a diagrammatic cross-sectional view of an alternative embodiment of the pressure release valve body of FIG. 4.

The plug member 201 is presented as having a circular cross-sectional shape in (as shown in cross-section in FIG. 5). However, the plug member 201 may have any cross-sectional shape or form. As illustrated in FIG. 6, a further embodiment of a plug member 301 is shown as having a substantially arcuate front surface 302. In the illustrated embodiment, the front surface 302 of the plug member 301 is configured to mimic, within the T-shaped valve body 91 as described above, the internal structure of a substantially elbow-type valve body. Although the internal form of the valve body of the present invention has adopted a substantially elbow-type shape, the plug member 301 acts to receive the high velocity and high pressure impacts imparted by particles, corroding agents, and chlorides which may be suspended in the stream exhausted from a pressure vessel. Over time, such high velocity and high pressure impacts may cause non-critical or critical structural damage to the front surface 302 of the plug member 301. If the front surface 302 of the plug member 201 suffers critical damage over time, the plug member 301 can easily be replaced with a new plug member without undue burden or cost to the user. In addition, the inner surface of the valve body 91 (a valve spindle, a sealing gland, etc) can be inspected with relative ease by simply removing the end plate 102 with the plug member 301 attached.

Furthermore, the substantially arcuate front surface 302 may sit proud of the bend 95a, thereby offering further protection to the bend 95a from the high velocity and high pressure impacts from particles suspended in the exhausted steam. Such an arrangement further extends the life of the valve body.

Figure 7:
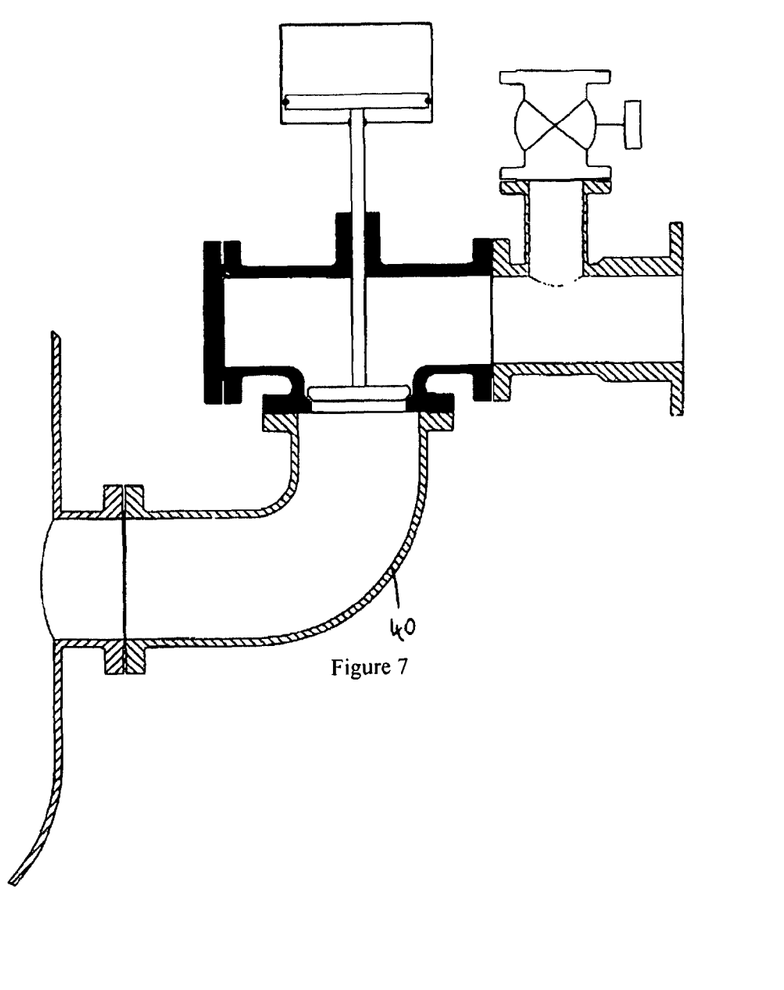
FIG. 7 is a diagrammatic cross-sectional view of the pressure release valve body of FIG. 4 connected to a horizontal remote pressure vessel.

FIG. 7 merely illustrates the valve body 91 of the present invention connected to a remote pressure vessel via connecting pipe 401. In this arrangement, the inlet flow direction and outlet flow direction of steam remains substantially perpendicular, as per the previously discussed embodiments.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A tubular valve body for enabling release of pressurized steam from a pressure vessel, the tubular valve body comprising:
    an integrated first flange with an inlet opening at one end thereof;
    an integrated second flange with another opening at another end thereof, wherein the integrated first and second flanges have an identical configuration;
    an integrated third flange with an outlet opening between the integrated first flange and the integrated second flange; and
    a removable plate covering and sealing the another opening at the integrated second flange,
    wherein an internal wall of the tubular valve body defines a flow path between the inlet opening and the outlet opening,
    wherein the outlet opening is larger than the inlet opening, and
    wherein the removable plate is composed of a planar plate having a planar surface that forms part of the internal wall of the tubular valve body.

2. The tubular valve body according to claim 1, further comprising:
    an inlet arm integral with the integrated first flange;
    an outlet arm integral with the integrated third flange; and
    an extension arm integral with the integrated second flange,
    wherein the inlet arm, the outlet arm, and the extension arm are integral,
    wherein the inlet opening is formed in a distal open end of the inlet arm,
    wherein the outlet opening is formed in a distal closable end of the outlet arm, and
    wherein the another opening is formed in a distal closable end of the extension arm.

3. The tubular valve body according to claim 2, wherein the inlet arm, the outlet arm and the extension arm each are cylindrical.

4. The tubular valve body according to claim 1, wherein the inlet opening and the another opening are concentrically arranged.

5. The tubular valve body according to claim 2, wherein the extension arm diverges away from the flow path linking the inlet opening with the outlet opening.

6. The tubular valve body according to claim 1, wherein the inlet opening and the outlet opening are disposed substantially perpendicular to one another.

7. The tubular valve body according to claim 2, wherein a central axis of the extension arm and a central axis of the outlet arm are substantially perpendicular to one another.

8. The tubular valve body according to claim 1, wherein the removable plate and the integrated second flange have a complementary engagement configuration.

9. The tubular valve body according to claim 2, wherein the removable plate further comprises a plug member receivable into the extension arm.

10. The tubular valve body according to claim 9, wherein the plug member is removably attached to the removable plate.

11. A tubular valve body for enabling release of pressurized steam from a pressure vessel, the tubular valve body comprising:
   an integrated first flange with an inlet opening at one end thereof;
   an integrated second flange with another opening at another end thereof, wherein the integrated first and second flanges have an identical configuration;
   an integrated third flange with an outlet opening between the integrated first flange and the integrated second flange;
   a removable plate covering and sealing the another opening at the integrated second flange; and
   a plug member removably attached to the removable plate,
   wherein an internal wall of the tubular valve body defines a flow path between the inlet opening and the outlet opening,
   wherein the outlet opening is larger than the inlet opening, and
   wherein a front face of the plug member defines a portion of the internal wall.

12. The tubular valve body according to claim 11, wherein the front face of the plug member is planar.

13. The tubular valve body according to claim 11, wherein the front face of the plug member is arcuate.

14. The tubular valve body according to claim 1, wherein the tubular valve body is reversible so that the opening at the integrated second flange becomes the inlet opening while the opening at the integrated first flange becomes the another opening.

15. The tubular valve body according to claim 2, wherein the inlet arm and the extension arm are substantially symmetrical about the outlet arm.

16. The tubular valve body according to claim 1, further comprising a port for a valve system operable to open and close the outlet opening.

* * * * *